United States Patent [19]

May et al.

[11] Patent Number: 4,933,916

[45] Date of Patent: Jun. 12, 1990

[54] PHASE MEASUREMENTS USING PSEUDO-RANDOM CODE

[75] Inventors: George A. May, Sooke; David M. Farmer, Saanichton, both of Canada

[73] Assignees: Canadian Patents and Development Limited; Societe Canadienne des Brevets et d'Exploitation Limitee, Sooke, Canada

[21] Appl. No.: 794,086

[22] Filed: Nov. 1, 1985

[51] Int. Cl.⁵ .............................................. G01S 3/80
[52] U.S. Cl. ..................................... 367/125; 367/124
[58] Field of Search ............ 343/5 NQ; 367/100, 125, 367/127, 124; 342/127, 194

[56] References Cited

U.S. PATENT DOCUMENTS

| | | |
|---|---|---|
| 3,430,149 | 2/1969 | Williams . |
| 3,761,829 | 9/1973 | Spaulding . |
| 3,868,686 | 2/1975 | Magorian ........................ 343/5 NQ |
| 3,940,731 | 2/1976 | Cooper et al. ..................... 367/100 |
| 3,970,946 | 7/1976 | Matsuo . |
| 4,024,540 | 5/1977 | Ofverberg ........................... 342/127 |
| 4,032,763 | 6/1977 | Glitz . |
| 4,090,145 | 5/1978 | Webb . |
| 4,203,164 | 5/1980 | Isaak et al. . |
| 4,208,734 | 6/1980 | Garber, Jr. et al. . |
| 4,297,700 | 10/1981 | Nard et al. .......................... 342/128 |
| 4,307,616 | 12/1981 | Vasile ................................... 367/100 |
| 4,357,610 | 11/1982 | Kingston et al. ................ 343/5 NQ |
| 4,359,735 | 11/1982 | Lewis et al. ...................... 343/5 NQ |
| 4,445,118 | 4/1984 | Taylor et al. . |
| 4,521,779 | 6/1985 | Lewis ................................... 342/194 |
| 4,575,861 | 3/1986 | Levreault . |
| 4,646,096 | 2/1987 | Brown .................................. 342/357 |
| 4,754,465 | 6/1988 | Trimble .................................. 375/1 |

OTHER PUBLICATIONS

Correlation Sonar Using Pseudo-Random Noise Codes, George A. May, 1983; Canadian Contractor Report of Hydrography & Ocean Sciences, No. 14.

Primary Examiner—Thomas H. Tarcza
Assistant Examiner—Daniel T. Pihulic
Attorney, Agent, or Firm—Christie, Parker & Hale

[57] ABSTRACT

Signal phase delay may be accurately measured by transmitting a pseudo-random noise coded reference signal, deriving in-phase and quadrature components of the received coded signal and then separately decoding the in-phase and quadrature components. This technique effectively compresses the transmitted signal pulse to a very narrow width (thereby simplifying discrimination of separate pulses with similar arrival times) while magnifying the pulse amplitude (thereby enhancing the signal to noise ratio).

8 Claims, 1 Drawing Sheet

PHASE MEASUREMENTS USING PSEUDO-RANDOM CODE

FIELD OF THE INVENTION

This application pertains to a method and apparatus for measuring the phase angle of a pseudorandom noise coded signal.

BACKGROUND OF THE INVENTION

Sonar signalling techniques for underwater speed measurement and echo location and other related techniques require precise determination of the delay between the time at which an acoustical signal pulse train is propagated into the water and the time at which the signal (or a relection of the signal) is received. Moreover, multiple path effects require that the transmitted acoustical pulses have a very short time duration. However, because the pulse energy decreases with the pulse duration, a compromise must be made between the degree of accuracy to which the pulse propagation delay can be ascertained and the signal-to-noise ratio which may be attained.

One way of overcoming the foregoing limitation is to pseudo-random noise code the transmitted acoustical pulses using either binary amplitude or phase modulation techniques. The received signal may then be decoded by correlating it, in known fashion, with a selected portion of the transmitted pseudo-random noise coded signal. The present invention provides a method and apparatus for utilizing the phase component of the received signal to determine the signal propagation delay time with great percision.

SUMMARY OF THE INVENTION

The preferred embodiment provides a method and apparatus for measuring signal phase delay. The method comprises transmitting a pseudo-random noise coded reference signal, deriving in-phase and quadrature components of the received coded signal, and then separately decoding the in-phase and quadrature components for comparison with similar components characteristic of the originally transmitted signal.

The preferred apparatus comprising pseudo-random noise code modulator means for pseudo-random noise coding a reference signal, transmitter means for transmitting the coded signal, receiver means for receiving the transmitted signal, first signal multiplier means for multiplying the received signal with the reference signal to produce a first vector component of the received signal, second signal multiplier means for multiplying the receiver signal with a 90° phase shifted replica of the reference signal to produce a second vector component of the received signal, first and second filters for removing high frequency signal components of the vector components, first signal decoder means for decoding the first vector component, and, second signal decoder means for decoding the second vector component.

DETAILED DESCRIPTION OF THE PREFERRED EMBODIMENT

Figure 1:
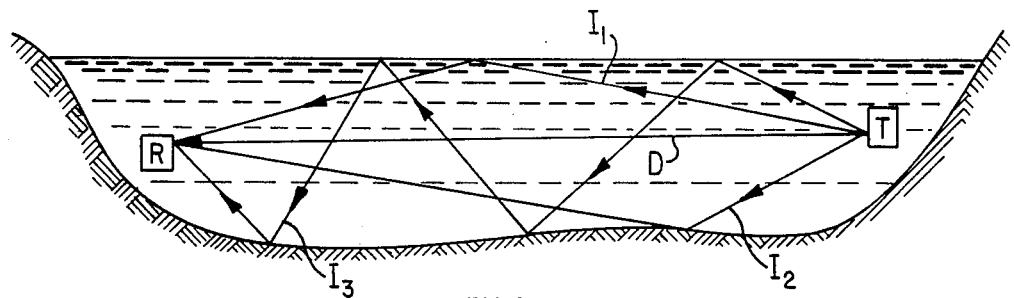
FIG. 1 is a side elevation view of an underwater channel in which an acoustical signal transmitter and receiver are positioned.

FIG. 1 is a side elevation view (having a vertical scale which has been greatly exaggerated, relative to the horizontal scale) of the underwater channel in which the acoustical signal transmitter "T" and receiver "R" are positioned. If an acoustic signal comprising a single pulse is propagated into the water by transmitter T, the signal may reach receiver R not only by traversing a direct path "D" between T and R, but also by traversing other paths along which the signal may, for example, be reflected off the surface of the water (i.e. path $I_1$, shown in FIG. 1), off the sea bed (i.e. path $I_2$, shown in FIG. 1), off unknown underwater obstructions, etc. Moreover, the signal may be relected several times before it reaches receiver R (i.e. path $I_3$, shown in FIG. 1). There may be several direct or wholly refracted paths and many possible relection paths which the signal may traverse in passing between transmitter T and receiver R. Thus, receiver R "sees" not just the single transmitted pulse, but many relicas thereof, each of which may traverse different paths between T and R and each of which arrive ar R at approximately the same time (because the relative differences between the lengths of the various signal paths are small). If the signal pulse duration is of the same order as the difference between the time required for the signal to traverse any possible pair of paths between T and R, then the received pulse replicas may overlap in time, making it difficult or impossible to discriminate between the individual received replicas of the transmitted pulse.

To overcome the foregoing problem one may significantly shorten the duration of the transmitted pulse, relative to the difference between the time required for the signal to traverse any possible pair of paths, thus facilitating separate detection of each pulse replica before the succeeding replica arrives and obscures its predecessor. Unfortunately however the signal to noise ratio attainable with short duration pulse is limited (because of the limited power of the transmitter and thus the limited energy of a short duration pulse) and, in many practical situations is inadequate to enable separation of the pulse from the background noise which typically characterizes underwater acoustic signalling enviroments. The need for a high signal to noise ratio may impose the requirement that the transmitted pulse length be greater than the difference between the time required for the pulse to traverse any of the possible pairs of paths between T and R, thus preventing their separation.

Thus, a compromise must be made between two conflicting ideals. On the one hand, signal to noise ratio is ideally maximized by transmitting a realtively long duration pulse. On the other hand, the pulse duration is ideally minimized to facilitate separate detection of pulses which traverse separate paths between T and R. The inventors have found that these apparently conflicting ideals can each be satisfied to an acceptably high degree by pseudo-random noise coding the transmitted signal and then separating the received signal into in-phase and quadrature components before those components are separately decoded to yield the in-phase and quadrature signal components which together contain the phase and amplitude information uniquely characterizing the transmitted pulse.

It happens that the phase angle of the received acoustical pulse together with pulse amplitude information permits more accurate time (i.e. signal propagation delay; and therefore distance) measurements to be made than those attainable by working with only the amplitude information contained in the received pulse. Thus, the problem is to accurately measure the phase angle of the received pulse relative to that of the transmitted pulse. At low frequencies (for example, below about 400 hertz) the received signal can be digitally sampled with sufficient resolution to determine its phase angle directly. However, at higher frequencies (for example, 10 kHz and above) the signal must be sampled so often that direct determination of the phase angle is not practical, due to the time required to process the sampled information. The inventors' novel approach described in the preceding paragraph has proved capable of very accurately extracting the phase angle of the received signal in high frequency acoustical signalling applications. Moreover, there is no reason why the inventors' technique could not be used in general electromagnetic signalling applications.

Figure 2:
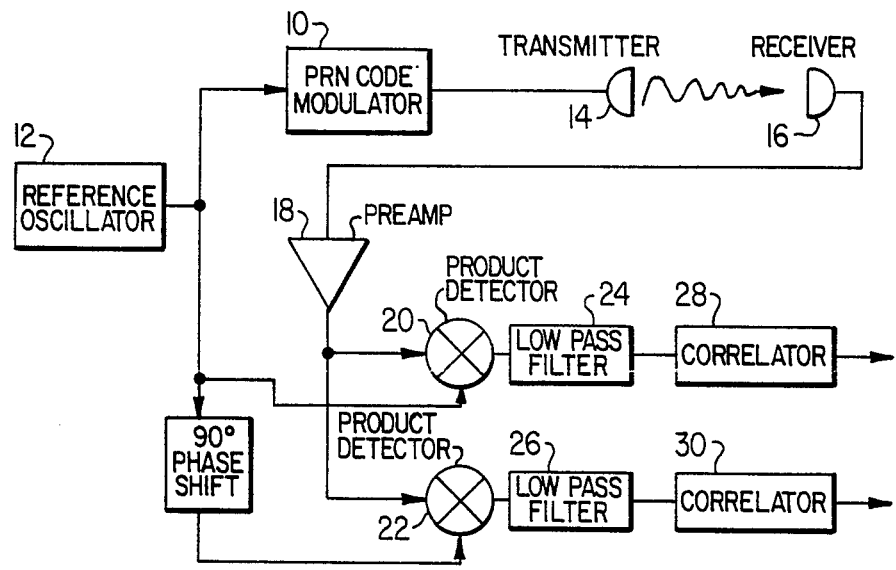
FIG. 2 is a block diagram of the modulator/demodulator apparatus of the preferred embodiment.

FIG. 2 is a block diagram of a modulator/demodulator apparatus for measuring the phase angel of a pseudo-random noise coded acoustical signal, thereby facilitating determination of the singal propagation delay. Pseudo-random noise code modulator 10 receives a reference signal of known phase from oscillator 12. The reference signal is pseudo-random noise code binary amplitude modualted by modulator 10 to yield the signal which is to be transmitted. Known pseudo-random noise coding techniques are used. In one preferred embodiment an "M7" pseduo-random code having a 127 "chip" coding template is used). The coded, modulated signal is propagated pagated into the water by transmitting transducer 14. The propagated signal may travel directly through the water to receiving hydrophone 16, or may be reflected by the sea floor, the sea surface, underwater structures and the like before reaching hydrophone 16. Hydrophone 16 produces an electrical output signal representative of the received acoustical signal(s).

The underwater path traversed by the propagated signal will vary depending upon the particular application. For example, in echo-ranging or Doppler back scatter applications the signal return path is typically a simple reflection in which case hydrophone 16 may be collocated with transmitter 14. In forward propagation measurement applications transmitter 14 and receiving hydrophone 16 are separate. However, in either case accurate measurement of the signal propagation delay requires accurate measurement not only of the received signal amplitude, but also of the phase of the received signal relative to the phase of the transmitted signal. For example, in forward propagation measurement applications there will be many signals received by hydrophone 16 including signals which pass directly through the water, signals reflected from the sea floor, signals reflected from the sea surface, signals reflected from underwater support structures and other underwater objects, signals wholly refracted along various paths, etc. These received signal components may be represented by $$\sum_j A_j(t) \cos(\omega t - \phi_j) \tag{1}$$

where $A_j(t)$ contains the binary ampliltude modulated wave envelope shape, and the attenuated amplitude received via return path j; $\omega$ is the instantaneous angular frequnecy of the signal; t is the time at which the signal sample is taken and $\phi_j$ is the phase delay given by:

$$\frac{1}{2\pi f} \int \frac{dx_j}{c_x} \tag{2}$$

where the integration is carried out along the acoustic path having sound speed c(x) at distance x along the path from the starting point.

The term:

$$\cos(\omega t - \phi_j) = \cos \omega t \cos \phi_j + \sin \omega t \sin \phi_j \tag{3}$$

may be treated as the orthogonal components of a vector. Accordingly, those vector components may be separately demodulated, by multiplication with the reference oscillator signal and low pass filtering and then correlated using known pseudo-random noise code correlation techniques.

The electrically converted signal received by hydrophone 16 is amplified by amplifier 18 and then coupled to first signal multiplier 20 which multiplies the received signal with the reference signal (of known phase) produced by oscillator 12, thereby yielding a first vector phase component of the received signal which is in phase with the oscillator reference signal. The amplified received signal is also coupled to a second signal multiplier 22 for multiplication with a 90° phase-shifted replica of the oscillator reference signal, thereby yielding a second vector phase component which is in quadrature with (i.e. orthogonal to) the first vector phase component produced by signal multiplier 20.

The first vector phase component produced by signal multiplier 20 is represented by the following equation:

$$\cos \omega t \sum_j A_j(t)(\cos \omega t - \phi_j) = \sum_j A_j(t) \tfrac{1}{2} [\cos(2\omega t - \phi_j) + \cos \phi_j]. \tag{4}$$

The first vector phase component is filtered by low pass filter 24, which removes the high frequency signal components to yield:

$$\sum_j \tfrac{1}{2} A_j(t) \cos \phi_j. \tag{5}$$

Similarly, the second vector phase component produced by signal multiplier 22 may be represented by the following equation:

$$\cos(\omega t + \tfrac{1}{2}\pi) \cdot \sum_j A_j \cos(\omega t - \phi_j) \tag{6}$$

which, after filtering by low pass filter 26 becomes:

$$\sum \tfrac{1}{2} A_j \sin \phi_j. \tag{7}$$

Expressions (5) and (7) give the quadrature vector phase components of the received signal. Accordingly, the phase of any individual received acoustical signal pulse $\phi_j$ may be determined by decoding (compressing) the received signal into its original individual pulses with the aid of sugnal decoders; namely, correlators 28, 30 which correlate the filtered first and second vector phase components, respectively, with the template used to pseudo-random noise code modulate the transmitted signal.

More particularly, the correlation process compresses each of the received pseudo-random noise coded signals into separate pulse of width approximately equal to the period of each "chip" in the pseudo-random noise coding template. Concurrently, the correlation process magnifies the amplitude of each of the compressed pulses by a factor N times the amplitude of the received signal; where N is the number of chips in the pseudo-random noise coding template. For example, in the embodiment on which an "M7" pseudo-random noise coding technique is used, the coding template has $2^7-1=127$ chips. This technique has the unique property that, when the received coded signal is correlated with the coding template, the correlator output product (i.e. the amplitude of the correlator output signal) is $-1$, except where the received coded signal coincides with the template, in which case the amplitude of the correlator output signal is magnified 63 times (or 127 times if phase encoding is used). Thus, the energy of the transmitted signal is compressed into a pulse having a duration of 1/127 that of the transmitted pulse sequence, effectively increasing the signal to noise ratio of the received signal by a factor of 63 (or 127 if phase encoding is used) or approximately 36 dB (or 42 dB respectively). (There are other pseudo-rnadom noise codes which will work just as well as the M7 code.)

Because a small change in signal path length produces a realtively large change in phase angle, and because the inventors' technique facilitates very fine resolution of phase angle, the signal propagation delay and distance traversed by the signal can be measured to a high degree of accuracy. If amplitude measurements alone are used, then the temporal resolution attainable would merely be proportional to the reciprocal of the signal bandwidth. Typically, the signal bandwidth is about 10% of the signal carrier frequency. Thus, about 10 cycles are required to build up the signal amplitude, whereas the measurements required in those applications of interest to the inventors require a separate examination of each cycle, necessitating far greater temporal resolution than is attainable with amplitude measurements alone. Suppose, for example, that two pseudo-random noise coded signals arrive at the receiver, having traversed paths of slightly different lengths. The signal amplitudes may differ only slightly, whereas the signal phase angles would differ significantly, thereby causing the realtive amplitude of the signals output by the correlators to differ significantly and facilitating simple discrimination of the two signals and accurate measurements of their phase angles.

It can be particularly difficult to resolve the phase ambiguity of a received signal which is out of phase with the transmitted signal by more than 360°. Experimental results have demonstrated that signal propagation delay estimates based solely on the amplitude of the signal (derived from the square root of the sum of the squares of the outputs of the two correlators) are sufficiently precise to enalbe resolution of the 360° phase ambiguity between the transmitted and received signals even if the signal sampling interval at the output of the correlators is five times the acoustical period. Resolution of the phase angle of the received signal was found to be better than 5°. These experiments were carried out using a 660 meter underwater signal path across a tidal channel at a frequency of 86 kHz.

As will be apparent to those skilled in the art in light of the foregoing disclosure, many alterations and modifications are possible in the practice of this invention without departing from the spirit or scope thereof. For example, the scheme described above has been simplified by utilizing amplitude modulation techniques. Phase encoding techniques may also be utilized with only slight additional electronic complexities, thereby allowing a signal to noise ratio improvement of 3 dB as indicated above. It will also be apparent to those skilled in the art that the method and apparatus herein described may be employed not only in underwater acoustic signalling environments, but in other applications as well. Accordingly, the scope of the invention os to be construed in accordance with the substance defined by the following claims.

We claim:

1. Apparatus for measuring signal phase delay, said apparatus comprising:
   (a) pseudo-random noise code modulator means for pseudo-random noise code modulating a reference signal;
   (b) transmitter means for transmitting said coded signal;
   (c) receiver means for receiving said transmitted signal;
   (d) first signal multiplier means for multiplying said received signal with said reference signal to produce a first vector component of said received signal;
   (e) second signal multiplier means for multiplying said received signal with a 90° phase shifted replica of said reference signal to produce a second vector component of said received signal;
   (f) first filter means for removing high frequency signal components of said first vector component;
   (g) second filter means for removing high frequency signal components of said second vector component;
   (h) first signal decoder means for decoding said first vector component; and,
   (i) second signal decoder means for decoding said second vector component.

2. Apparatus as defined in claim 1, wherein said transmitted signal is an electromagnetic signal.

3. Apparatus as defined in claim 1, wherein said transmitted signal is an acoustic signal.

4. Apparatus aas defined in claim 3, wherein said transmitted signal is transmitted underwater.

5. Apparatus as defined in claim 1 wherein said transmitted signal has a frequency greater than about 10 kHz.

6. Apparatus as defined in claim 3, wherein said transmitted signal has a frequency greater than about 10 kHz.

7. Apparatus as defined in claim 4, wherein said transmitted signal has a frequency greater than about 10 kHz.

8. A method of measuring signal phase delay, comprising:
   (a) pseudo-random noise code modulating a reference signal;
   (b) transmitting said coded signal;
   (c) receiving said transmitted signal;
   (d) multiplying said received signal with said reference signal to derive in-phase and quadrature components of said received signal; and subsequently,
   (e) separately decoding said in-phase and quadrature components.

* * * * *